(12) United States Patent
Madiraju Varadaraju et al.

(10) Patent No.: US 10,719,404 B2
(45) Date of Patent: *Jul. 21, 2020

(54) EXCLUDING FILES IN A BLOCK BASED BACKUP

(71) Applicant: EMC IP Holding Company LLC, Hopkinton, MA (US)

(72) Inventors: Kiran Kumar Madiraju Varadaraju, Bangalore (IN); Neelabh Mam, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 203 days.

This patent is subject to a terminal disclaimer.

(21) Appl. No.: 15/788,877

(22) Filed: Oct. 20, 2017

(65) Prior Publication Data

US 2018/0039547 A1    Feb. 8, 2018

Related U.S. Application Data

(63) Continuation of application No. 13/830,138, filed on Mar. 14, 2013, now Pat. No. 9,823,974.

(51) Int. Cl.
*G06F 11/14* (2006.01)

(52) U.S. Cl.
CPC ...... *G06F 11/1448* (2013.01); *G06F 11/1451* (2013.01); *G06F 11/1469* (2013.01)

(58) Field of Classification Search
CPC .............. G06F 11/1448; G06F 11/1451; G06F 11/1469
See application file for complete search history.

(56) References Cited

U.S. PATENT DOCUMENTS

| | | | |
|---|---|---|---|
| 2007/0276885 A1* | 11/2007 | Valiyaparambil | G06F 11/1451 |
| 2011/0088027 A1* | 4/2011 | Jelvis | G06F 9/4411 717/174 |
| 2013/0110778 A1 | 5/2013 | Taylor | |
| 2014/0089582 A1 | 3/2014 | Kobayashi | |

OTHER PUBLICATIONS

MSDN, "Excluding Files from Shadow Copies", Feb. 1, 2012, Microsoft, Build Date: Sep. 7, 2011,3 pages. (Year: 2011).*
MSDN2, "CVssWriterOnPostSnapshot method", Jul. 8, 2012, Microsoft, 2 pages. (Year: 2012).*
Author Unknown, "How do I exclude certain files and folders from Backup Restore /Vss / shadow copy?", Jun. 26, 2009, http://answers.microsoft.com/en-us/windows/forum/windows_vista-performance/how-do-i-exclude-certain-files-and-folders-from/e3a77ff2-caa0-405d-9fb7-3cf26841cb23.
Author Unknown, "The Story of 3.0 File and Folder Excludes", Jan. 5, 2009.
MSDN, "Excluding Files from Shadow Copies", Feb. 1, 2012, Microsoft, Build Date: Sep. 7, 2011, 3 pages.
MSDN2, "CVssWriterOnPostSnapshot method", Jul. 8, 2012, Microsoft, 2 pages.

* cited by examiner

*Primary Examiner* — Alexander Khong
(74) *Attorney, Agent, or Firm* — Van Pelt, Yi & James LLP

(57) ABSTRACT

Techniques to back up data are disclosed. In various embodiments, a shadow copy of a source volume is created. An excluded file is deleted from the shadow copy. One or more blocks modified in the shadow copy in connection with deleting the excluded file from the shadow copy are tracked.

19 Claims, 4 Drawing Sheets

EXCLUDING FILES IN A BLOCK BASED BACKUP

CROSS REFERENCE TO OTHER APPLICATIONS

This application is a continuation of co-pending U.S. patent application Ser. No. 13/830,138, entitled EXCLUDING FILES IN A BLOCK BASED BACKUP filed Mar. 14, 2013 which is incorporated herein by reference for all purposes.

BACKGROUND OF THE INVENTION

When backing up data it may be desirable to exclude certain files from being backed up. For example, if the backup is being performed to protect user data, such as files or other objects created by the user using one or more applications, it may be desirable to exclude operating system files from being backed up, to avoid using associated storage space for example. Or, in backing up virtual machine data it may be desirable to back up operating system and/or virtual machine state-related files but not application data, such as Exchange Server objects, which may already be backed up by another system and/or process.

In a file-based backup, typically a list of files to be excluded from the backup is created and used to skip the files on the exclude list as the backup application walks the file system to create the backup. In a block-based backup, by contrast, the backup is performed at the volume level and it is not as simple a matter to skip files on the exclude list. Instead, it is necessary to determine which blocks store file data and/or metadata associated with files to be excluded, and to omit those from the backup data. On incremental backup, moreover, it is necessary to determine which blocks modified on the source volume are associate with files (data and/or metadata) that have been excluded from the prior backup(s) and for consistency are desired to continue to be excluded from the current incremental backup.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Techniques to exclude files from a block-based backup are disclosed. In various embodiments, a shadow copy of a source volume is created. Files to be excluded from the backup are deleted, using a file delete functionality of the operating system. The file system updates associated metadata in the shadow copy, to reflect the deletion. Writes to the shadow volume are tracked, using a write tracker filter driver interposed in the shadow volume driver stack. The tracking data is used to identify blocks to be excluded from a subsequent incremental backup.

Figure 1:
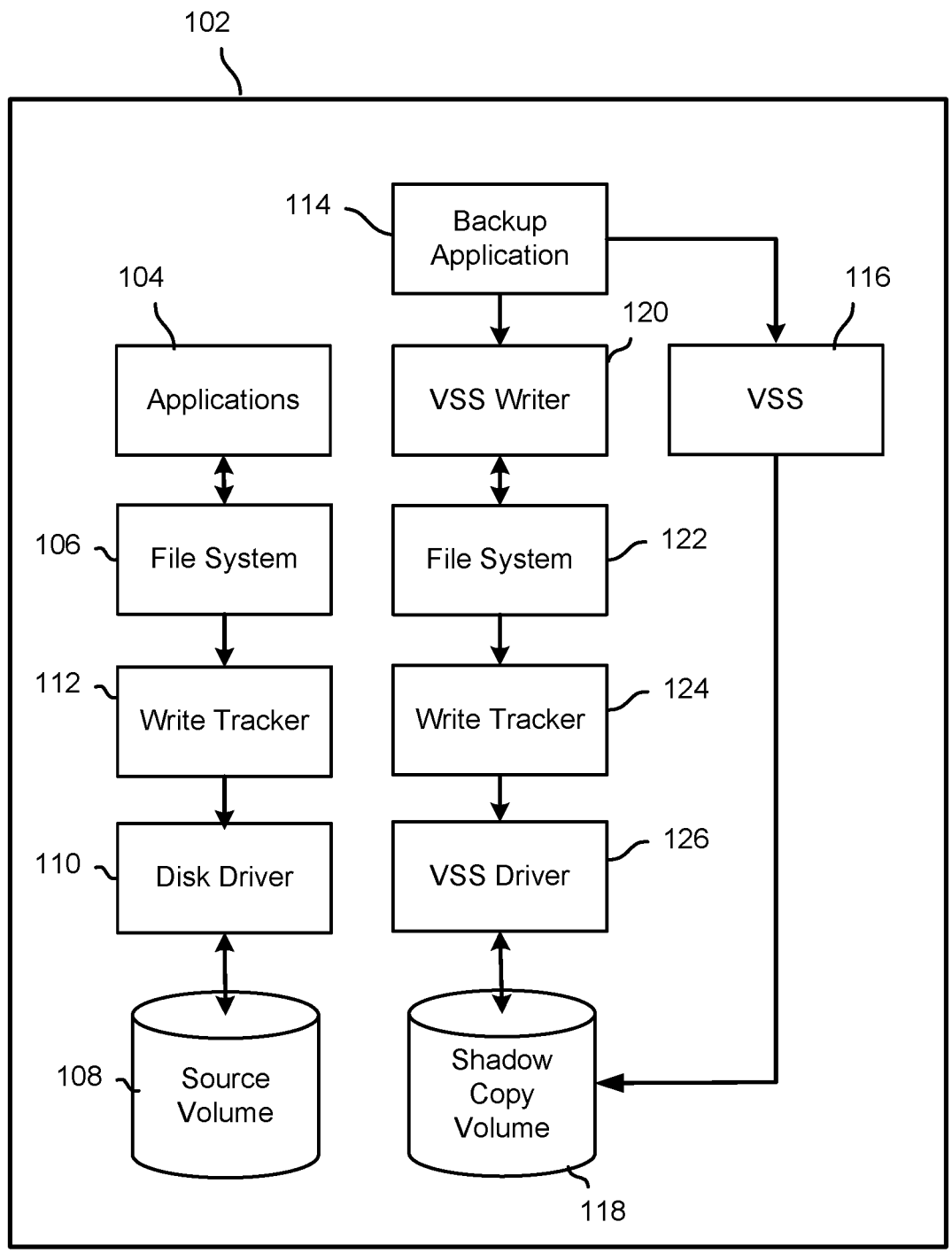
FIG. 1 is a block diagram illustrating an embodiment of a computer system.

FIG. 1 is a block diagram illustrating an embodiment of a computer system. In the example shown, the computer 102, such as a file or other server, includes one or more processors, memory, and persistent storage such as one or more disk drives (not shown). One or more applications 104 run on an operating system (not shown) and provide the ability to end users to create and modify application content objects, such as documents or other files. Applications 104 interact with a file system 106, e.g., the NTFS file system, to store files or other objects in a source volume 108 on a storage device, such as a disk drive. To read from and write to source volume 108, file system 106 interacts with a disk driver 110, which performs the low level commands and interactions with the storage device on which source volume 108 is stored to read and write data to storage blocks comprising source volume 108, as needed. In the example shown, a writer tracker, e.g., a filter driver, 112 associated with a backup application (e.g., a backup client or other software) 114 intercepts and/or observers writes from file system 106 to source volume 108, using disk driver 110. In various embodiments, write tracker 112 may track which blocks have been modified, for example since a last full or incremental backup, enabling blocks that have been modified to be identified for inclusion in a subsequent incremental backup.

Referring further to FIG. 1, backup application 114 in the example shown interacts with a virtual shadow copy service (VSS) architecture 116 of the operating system of computer 102, e.g., Microsoft Windows®, to generate and store a shadow copy 118 of source volume 108. For example, a full backup of source volume 108 may be performed by copying all blocks in source volume 108 that have user data and/or file system metadata stored in them. Or, in some embodiments, a shadow copy of the entire volume, including unused blocks, may be created. In various embodiments, the shadow copy volume 118 is created in a manner that enables the shadow copy to be accessed and modified later. In some embodiments, a shadow copy service "context" that enables modifications to be made later is specified.

In various embodiments, once the shadow copy volume 118 has been created, a VSS writer 120 associated with the backup application 114 accesses the shadow copy volume 118 via file system 122 (in some embodiments the same, e.g., NTFS, file system as file system 106), to delete files desired to be excluded from the backup. The backup application 114 and/or another module provides to VSS writer 120 a list of files to be excluded, for example by specifying a path to and within the shadow copy volume 118 at which each file to be deleted is located. In various embodiments, the VSS writer 120 invokes a standard file delete API of file system 122, which results in the file data being deleted and associated metadata being updated in shadow copy volume 118. The interaction specifies for each file to be deleted a location within shadow copy volume 118 at which the file to be deleted is located. The corresponding source file in source volume 108 is not deleted.

In the example shown, file system 122 deletes the specified files via a write tracker 124 and a VSS driver 126. The write tracker 124 keeps track of which blocks in shadow copy volume 118 are modified in connection with the deletion of excluded files.

Figure 2:
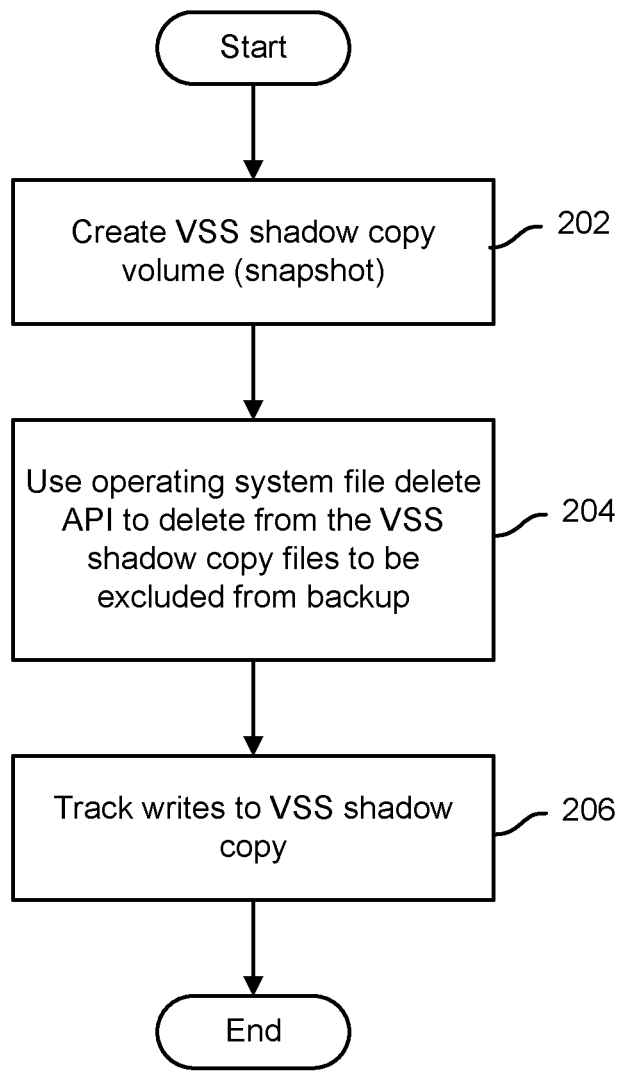
FIG. 2 is a flow chart illustrating an embodiment of a process to back up data.

FIG. 2 is a flow chart illustrating an embodiment of a process to back up data. In the example shown, a VSS shadow copy volume (or other snapshot) is created (202). The operating system (i.e., file system) file delete API is used to delete from the shadow copy volume those files desired to be excluded from the backup (204). A writer tracker, e.g., a writer tracker filter driver, interposed between the file system and a VSS driver used to delete files from the shadow copy tracks changes to the shadow copy, e.g., which blocks were modified in connection with deletion of the excluded files (206).

Figure 3:
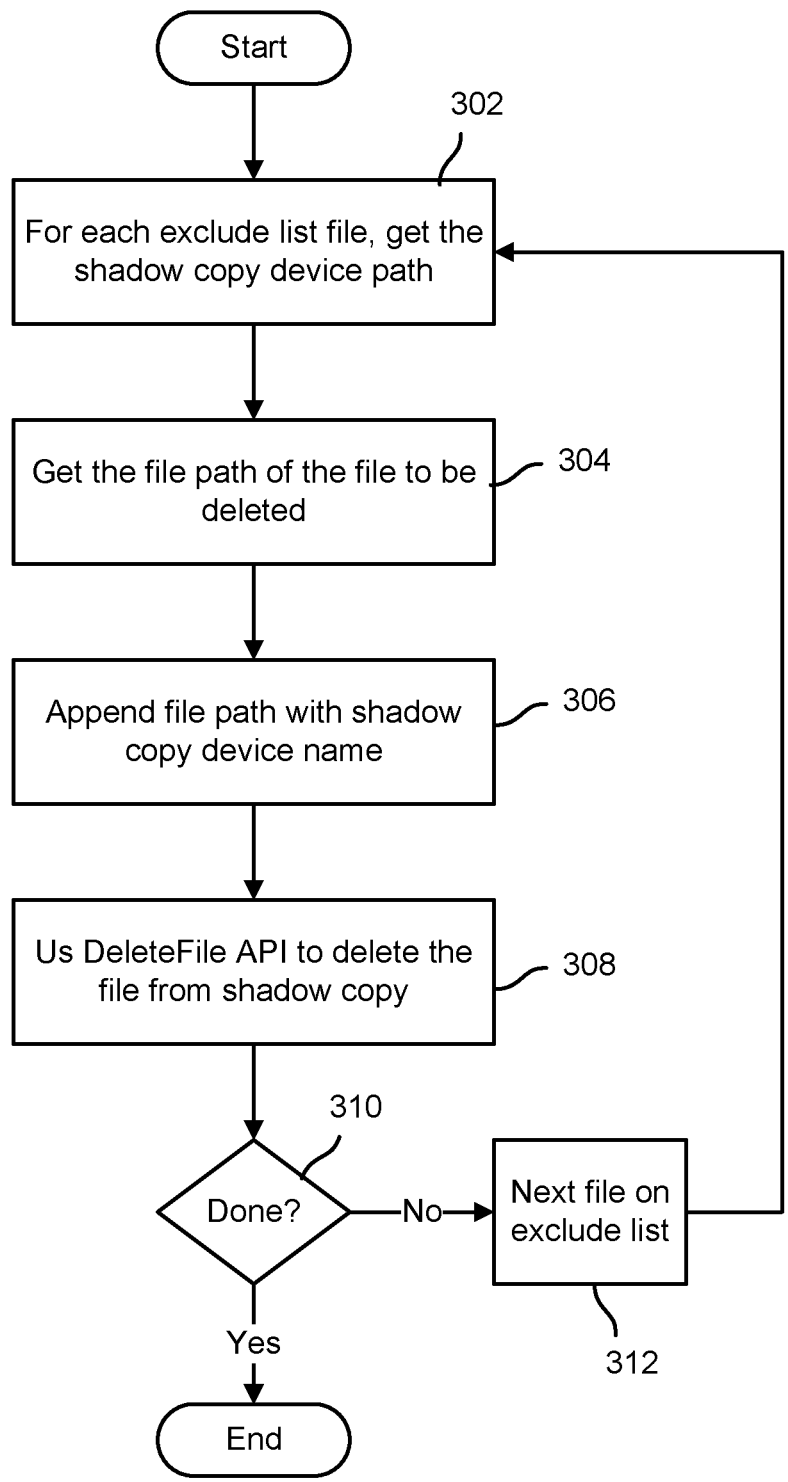
FIG. 3 is a flow chart illustrating an embodiment of a process to exclude files from a block-based backup via a VSS shadow copy volume.

FIG. 3 is a flow chart illustrating an embodiment of a process to exclude files from a block-based backup via a VSS shadow copy volume. In various embodiments, step 204 of FIG. 2 includes the process of FIG. 3. In the example shown, for each file on the list of files to be excluded, the shadow copy device path is obtained (302), e.g., \\?\GLOBALROOT\Device\HarddiskVolumeShadow Copy8. For each file, the file path of the file to be deleted is obtained (304) and appended with the shadow copy device name (306), e.g., W\GLOBALROOT\Device\HarddiskVolumeShadow Copy8\docs\ABC.doc. The file deletion API of the file system, e.g., the DeleteFile API of Windows Operating system, is used to delete each file from the shadow copy volume (308). The process is repeated for each file on the exclude list until all files to be excluded have been deleted from the shadow copy volume (310, 312). In a various embodiments, the file deletions from the shadow volume are tracked, e.g., by a write tracker such as write tracker 124 of FIG. 1.

Figure 4:
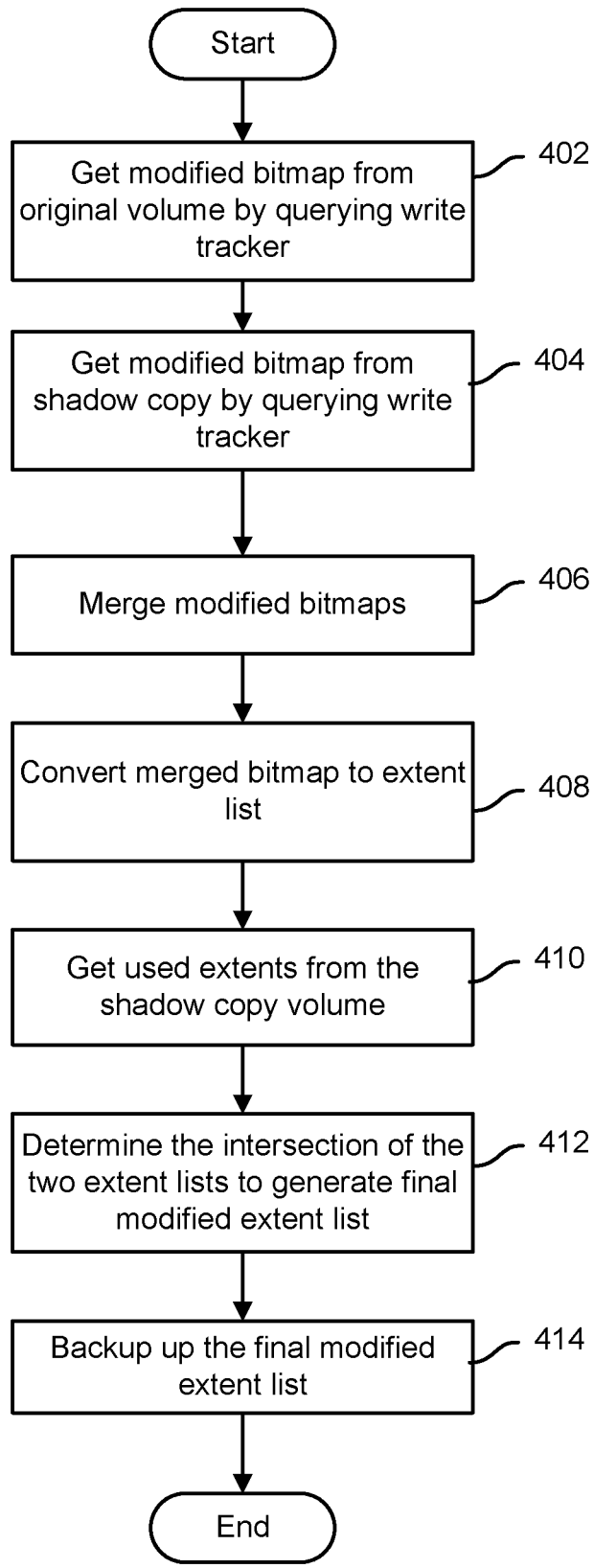
FIG. 4 is a flow chart illustrating an embodiment of a process to perform a block-based incremental backup.

FIG. 4 is a flow chart illustrating an embodiment of a process to perform a block-based incremental backup. In various embodiments, a VSS or other shadow copy volume created as described herein, i.e., to exclude files by deleting them from a shadow copy volume after a snapshot has been taken, is used as a starting point for an incremental backup using the process of FIG. 4. In the example shown, a bitmap indicating blocks which were modified in the source volume since the last backup is obtained, for example from a write tracker such as writer tracker 112 of FIG. 1 (402). A bitmap indicating blocks which were modified in the shadow copy volume after the snapshot was created, e.g., to delete files desired to be excluded from the backup, is obtained, for example from a write tracker such as writer tracker 124 of FIG. 1 (404). The bitmaps indicating blocks modified in the source volume (402) and the shadow copy volume (404) are merged (406) to generate a merged bitmap. For example, blocks modified in both the source volume and the shadow copy volume may be associated with a file desired to be excluded from backup, and may be included in the modified bitmap from the shadow copy volume, for example, as a result of being associated with (metadata and/or data) a file that was deleted from the shadow copy volume to exclude it from the backup. As a result, to exclude the file and associated metadata from the incremental backup as well, e.g., to ensure consistency and avoid backing up unwanted data, the blocks modified both in the source volume and in the shadow copy may be omitted from the merged bitmap. This would capture consolidated changes that were done both to the source volume as well as our VSS writer doing exclude operations on the shadow copy by deleting the said files to be excluded from the backup. Merge of two bitmaps is a bitwise AND operation on the two bitmaps. BIT denoting 0 as used and 1 as unused, we do a bitwise AND operation to consolidate changes.

Referring further to FIG. 4, the merged bitmap is converted to an extent list (408). A list of used extents is obtained from the shadow copy volume (410). The extents generated from the merged bitmap (408) and the "used" extents from the shadow copy volume (410) are used to determine an intersection of the two to generate a final modified extent list (412). Find the valid changes that were done by the APP on the source volume as well as delete transactions done on the shadow copy. For example, a file named "ABC.doc" could be created of size 100 MB. This transaction makes the write tracker driver record 100 MB of range as marked in the bitmap to indicate that it needs to be backed up during the next incremental backup.

Case 1: The same file (ABC.doc) is deleted on the source volume before the incremental backup is triggered. In that case, the file system updates the metadata block of that file saying that the file is deleted and frees up the used blocks space occupied by that file. But the write tracker driver still accounts for 100 MB of range that it reports as changed to be backed up. To solve this kind of problem, we find the common extents from the driver reported merged extent list and the file system reported used blocks list during the time of backup. Since the file system freed that particular zone of range 100 MB as unused. It would not be present in the intersected extent list. Case 2: The same file ABC.doc is specified by the user as a file to be excluded and the VSS writer deletes the file on the shadow copy. This would again result in the file system making similar transactions on the shadow copy and freeing up the used blocks space occupied by that file. Again the intersection of driver reported merged extent list and the file system reported used blocks list would not contain the blocks that were occupied by the file ABC.doc. Case 3: The file ABC.doc is not deleted on the source volume nor it is specified to be excluded from the backup. Then the intersection of driver reported merged extent list and the file system reported used blocks list would now account for the range that was occupied by file ABC.doc and be present in the backup media, since no delete operation was made neither on the source volume by the APP or nor on the shadow copy by the VSS writer. Case 4: Two incremental backups are taken and ABC.doc is not part of exclude list and is present in the source volume. Further appends/updates to the file ABC.doc of 2 MB are made and the same 2 MB range is then captured by the write tracker driver as changed blocks and reported via the bitmap during subsequent incremental workflows. This time though during the third incremental backup the file ABC.doc is now part of the exclude list item and our VSS writer deletes the file on the snapshot volume. The file system updates the metadata block of ABC.doc file to indicate that it has been removed, which involves writes to be made to the snapshot volume which is now captured by the write tracker driver which is attached to the shadow copy device stack also. Then the file system frees up the used blocks space occupied by that file. Further when the source volume driver bitmap and the shadow copy volume driver bitmap is merged, it now contains the consolidated changes, which reflect the file ABC.doc removal transaction. Finally when the intersection of driver reported merged extent list and the file system reported used blocks list is done it would not contain the blocks that were occupied by the file ABC.doc. The final modified extent list is used to perform the incremental backup, e.g., by copying those extents to backup media (414). Final changed blocks is then backed up into a differencing disk VHD format backup media which is further chained to its parent VHD.

Using techniques disclosed herein, a block-based backup can be performed using the virtual shadow copy service (VSS) or similar architecture, and files desired to be excluded from the backup can be excluded in a manner that facilitates subsequent incremental backups that also exclude the same files and associated metadata.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of backing up data, comprising:
   creating a shadow copy of a source volume;
   determining an excluded file from among files on the shadow copy, wherein the excluded file corresponds to a file that is to be excluded from a backup;
   adding the excluded file to a list of files to be excluded;
   tracking one or more blocks of the source volume that are modified after the shadow copy is created; and
   performing an incremental backup, wherein the performing of the incremental backup includes determining one or more blocks of the source volume to be backed up in connection with the incremental backup based at least in part on the list of files to be excluded, at least one of the tracked one or more blocks of the source volume that are modified, and a merged bitmap corresponding to a merger of a first bitmap associated with the shadow copy and a second bitmap associated with the source volume.

2. The method of claim 1, wherein the shadow copy comprises a virtual shadow copy volume.

3. The method of claim 2, wherein creating the shadow copy includes invoking a virtual shadow copy service (VSS) of an operating system associated with the source volume.

4. The method of claim 3, further comprising deleting the excluded file from the shadow copy, wherein deleting the excluded file from the shadow copy includes accessing the shadow copy and using a VSS writer to invoke a delete file API of an operating system with which the source volume is associated.

5. The method of claim 1, wherein the one or more blocks of the source volume that are modified are tracked using a write tracker filter driver.

6. The method of claim 1, wherein tracking the one or more blocks of the source volume that are modified includes updating a bitmap or other data structure.

7. The method of claim 6, wherein the merged bitmap or other data structure is used to perform the incremental backup of the source volume, the using of the merged bitmap or other data structure to perform the incremental backup of the source volume including merging the bitmap or other data structure with a corresponding bitmap or other data structure associated with modifications to the source volume.

8. The method of claim 7, further comprising converting the merged bitmap or other data structure to an extent list.

9. The method of claim 8, further comprising determining an intersection between the extent list and a corresponding used block extent list associated with the source volume to generate a final extent list to be used to perform the incremental backup.

10. The method of claim 1, wherein the determining of the one or more blocks of the source volume to be backed up in connection with the incremental backup is based at least in part on (i) the one or more blocks of the source volume that are modified, and (ii) an indication of one or more blocks modified in the source volume.

11. A system to back up data, comprising:
    a memory or other storage device; and
    a processor coupled to the memory or other storage device and configured to:
       create and store in the memory or other storage device a shadow copy of a source volume;
       determine an excluded file from among files on the shadow copy, wherein the excluded file corresponds to a file that is to be excluded from a backup;
       add the excluded file to a list of files to be excluded;
       track one or more blocks of the source volume that are modified after the shadow copy is created; and
       perform an incremental backup, wherein performing the incremental backup includes determining one or more blocks of the source volume to be backed up in connection with the incremental backup based at least in part on the list of files to be excluded, at least one of the tracked one or more blocks of the source volume that are modified, and a merged bitmap corresponding to a merger of a first bitmap associated with the shadow copy and a second bitmap associated with the source volume.

12. The system of claim 11, wherein the shadow copy comprises a virtual shadow copy volume.

13. The system of claim 12, wherein creating the shadow copy includes invoking a virtual shadow copy service (VSS) of an operating system associated with the source volume.

14. The system of claim 13, wherein the processor is further configured to delete the excluded file from the shadow copy, to delete the excluded file from the shadow copy includes accessing the shadow copy and using a VSS writer to invoke a delete file API of an operating system with which the source volume is associated.

15. The system of claim 11, wherein the one or more blocks that are modified are tracked using a write tracker filter driver.

16. The system of claim 11, wherein tracking the one or more blocks that are modified includes updating a bitmap or other data structure.

17. The system of claim 16, wherein the merged bitmap or other data structure to is used to perform the incremental backup of the source volume, the using of the merged bitmap or other data structure to perform the incremental backup of the source volume including merging the bitmap or other data structure with a corresponding bitmap or other data structure associated with modifications to the source volume.

18. The system of claim 17, wherein the processor is further configured to convert the merged bitmap or other data structure to an extent list.

19. A computer program product to back up data, the computer program product being embodied in a tangible, non-transitory computer readable storage medium and comprising computer instructions for:

creating a shadow copy of a source volume;
determining an excluded file from among files on the shadow copy, wherein the excluded file corresponds to a file that is to be excluded from a backup;
adding the excluded file to a list of files to be excluded;
tracking one or more blocks of the source volume that are modified after the shadow copy is created; and
performing an incremental backup, wherein the performing of the incremental backup includes determining one or more blocks of the source volume to be backed up in connection with the incremental backup based at least in part on the list of files to be excluded, at least one of the tracked one or more blocks of the source volume that are modified, and a merged bitmap corresponding to a merger of a first bitmap associated with the shadow copy and a second bitmap associated with the source volume.

* * * * *